United States Patent
Alexander et al.

(10) Patent No.: US 6,316,373 B1
(45) Date of Patent: Nov. 13, 2001

(54) EXPANDABLE BREATHABLE LAMINATE

(76) Inventors: William Kenneth Alexander, 147 Berlin Dr., Knoxville, TN (US) 37923; Patrick J. O'Neill, 6526 Newburgh Rd., Evansville, IN (US) 47715

( * ) Notice: Subject to any disclaimer, the term of this patent is extended or adjusted under 35 U.S.C. 154(b) by 0 days.

(21) Appl. No.: 08/638,344

(22) Filed: Apr. 26, 1996

(51) Int. Cl.$^7$ ..................................................... B32B 5/24
(52) U.S. Cl. ..................... 442/221; 442/263; 442/286; 428/304.4; 428/317.1; 428/317.5; 428/317.7; 428/318.4
(58) Field of Search ................. 428/304.4, 297, 428/317.1, 317.5, 245, 246, 261, 284, 286, 317.7, 318.4; 442/263, 286, 221

(56) References Cited

U.S. PATENT DOCUMENTS

| | | |
|---|---|---|
| 3,642,563 * | 2/1972 | Davis et al. . |
| 4,260,440 * | 4/1981 | Frankenberg .................... 156/163 |
| 4,463,036 * | 7/1984 | Totten et al. . |
| 4,563,507 | 1/1986 | Dyer ..................................... 525/426 |
| 4,672,005 | 6/1987 | Dyer ................................... 428/474.4 |
| 4,705,831 | 11/1987 | Dyer ..................................... 525/426 |
| 4,726,968 | 2/1988 | Hayashi et al. ........................ 427/342 |
| 4,743,267 | 5/1988 | Dyer ........................................... 8/194 |
| 4,790,907 | 12/1988 | Mallen et al. ..................... 167/157.1 |
| 4,806,125 | 2/1989 | Dyer ....................................... 8/116.1 |
| 4,921,890 | 5/1990 | Hayashi et al. ...................... 523/507 |
| 5,154,727 | 10/1992 | Dyer ........................................... 8/194 |
| 5,178,163 * | 1/1993 | Yewer, Jr. . |
| 5,295,948 | 3/1994 | Gray ......................................... 602/5 |
| 5,735,801 | 4/1998 | Cropper . |

OTHER PUBLICATIONS

Kick the Neo–Prene Habit, Biomechanics Magazine, Dec. 2000, Kristen M. Rountree.
Advertisement for Bio–Skin, Cropper Medical/Bio–Skin, Inc.

* cited by examiner

Primary Examiner—Elizabeth M. Cole

(57) ABSTRACT

An expandable breathable laminate is described. The laminate includes a reticulated polymer layer and an fibrous layer. The fibrous layer is chemically treated so as to facilitate transfer of liquid through the fibrous layer and ultimately through the polymer layer via capillary action. The layers are bonded with an adhesive that does not impair the breathability and expandability of the laminate. Thus, removal of perspiration from the skin of the wearer of a garment made from the laminate can be accomplished.

23 Claims, 2 Drawing Sheets

EXPANDABLE BREATHABLE LAMINATE

BACKGROUND OF THE INVENTION

The present invention relates generally to elastic laminated fabric useful in the manufacture of orthotic devices, garments, shoes and the like; or in the manufacture of other body-coverings such as bandages or the like. In particular, the invention relates to expandable laminates which exhibit enhanced air and water vapor transport characteristics through the thickness thereof.

Laminated materials of the general type used in the manufacture of garments, which term includes whole body garments such as wet suits for example and partial body garments such as shorts, gloves, and limb or joint supports, for example, as well as laminated materials used in other applications where expandability of the product is of importance, heretofore have generally included: (1) knitted or woven products wherein the expandability is provided for by the knit design; (2) materials wherein extensibility is imparted to the material by physical means, such as by crimping of paper or synthetic webs; or, (3) materials which are inherently expandable such as knitted cloth-coated rubber-like products, Neoprene. In those applications where the material of construction is to be subjected to considerable stress or strain, the choice of materials has generally been limited to the knitted or woven materials, or the neoprene-type materials. Further, in those applications where the laminate is to be in contact with the body (human or animal) and also likely to be subjected to considerable stress and/or strain, the materials of choice are the knitted or woven materials inasmuch as Neoprene is somewhat uncomfortable when used by itself in a body garment. However, in certain applications, it is desired that the material not only be capable withstanding the anticipated stress or strain, but it also must possess other important properties. For example, in wet suits, the material of construction must be "water proof" and expandable to permit the suit to be applied to the person. In similar manner, in the manufacture of certain knee, elbow and leg bandages (supports), it is required that the garment be capable of being expanded to fit it over the appendage and that, once in place, that the garment aid in holding heat and moisture to the covered body part. Neoprene, alone, is extremely difficult to slide over a body part due to the friction between the body part and the Neoprene. To overcome this disadvantage, the Neoprene is laminated to a knitted layer of cotton, polyester or like material, this knitted layer being disposed next to the body part and providing improved sliding engagement of the garment with a body part to permit the application of the garment to the body part. In this laminated material, both the rubber-like substrate and the knitted layer are expandable. Neoprene, however, is a closed cell type foam which makes it desirable in wet suits and for holding heat and moisture against a body part, but which also makes the garment inappropriate for those applications where breathability of the garment is desired. "Breathability" as used herein generally denotes the transfer of heat, i.e., gas, and particularly moisture (liquid or vapor) through the thickness of the material in question.

The transfer of heat from the human body, for example, is effected naturally by the biological function of perspiring. As an athlete, for example, performs, his body uses energy and generates heat. Natural perspiration dissipates this heat through the mechanism of water elimination from the body at the skin and the accompanying cooling of the body due to the evaporation of the perspiration from the skin to the ambient atmosphere. The efficiency of this cooling process can effect the efficiency of the athlete's performance. It is desired, therefore, that there be a material which exhibits the general properties of expandability, ease of application to the body, and good breathability. A garment manufactured from such a material would provide the desired support to the body part (expandability) and provide for the efficient dissipation of body heat. Neoprene is not breathable. To the contrary, it captures heat and moisture between a garment and a body part, which in many applications, is highly undesirable.

What is needed, then, is an expandable breathable laminate that is useful in the manufacture of garments. This laminate is presently lacking in the prior art.

SUMMARY OF THE INVENTION

In accordance with the present invention, there is provided a laminated material which exhibits both the desired degree of expandability, the desired breathability, and enhanced liquid transfer and dissipation, as by evaporation. In general, the new laminate comprises a first layer of a reticulated polymer, which term is deemed to include natural rubber. The polymer is resilient in nature and exhibits the expandability and contractibility desired and also possesses the open cell construction which permits the movement of heat and moisture through the thickness of a layer of the polymer. To one of the opposite surfaces of this first layer, the present invention laminates a second layer, such second layer being a woven or knitted web of natural or synthetic fibrous yarns or threads, i.e., a fibrous layer. The lamination process is carefully chosen to avoid plugging a material number of the open passageways through the thickness of either the polymer or the fibrous layer. Preferably, a third layer of the same or like fibrous web material is similarly laminated to the opposite one of the surfaces of the polymer layer. Either prior to or after lamination to the polymer layer, the fibrous layers are chemically treated to enhance their ability to transfer moisture along each yarn or thread of the fibrous layers, hence, through the thickness of each fibrous layer and along the planar dimension of the layer. Unexpectedly, this chemical treatment has been found to also enhance the transfer of moisture through the thickness of the polymer layer with the result that the overall transfer of moisture through the combined thicknesses of the polymer layer and the fibrous layers is greater than the transfer of moisture through the thickness of these layers without the chemical treatment of the fibrous layers. Chemical treatment of the polymer is not required, nor preferred, but such chemical treatment of the polymer layer has not been found to be deleterious to the overall desired effect of liquid transfer through the thickness of the laminate material. This unexpected property of the present laminate enhances the removal of body heat, keeping the body cool while providing the desired support to the covered body part.

The lamination process is facilitated by the use of an adhesive that that bonds the polymer layer to the fibrous layer without impairing the breathability or the expandability of either the polymer layer or the fibrous layer.

It is therefore an object of the present invention to provide a laminated material which is useful in the manufacture of garments.

It is another object of the present invention to provide a laminated material which exhibits enhanced ability to cool a body part which is covered by a garment made from the laminated material.

It is another object of the present invention to provide an improved garment for a body part wherein the garment simultaneously provides support for the body part and enhanced cooling of the covered body part.

It is yet another object of the present invention to provide a laminated material, and garments made therefrom, which retard the growth of bacteria by facilitating the removal of perspiration from the covered body part.

Other objects and advantages of the present invention will be recognized from the accompanying description.

DESCRIPTION OF THE PREFERRED EMBODIMENT

Figure 1:
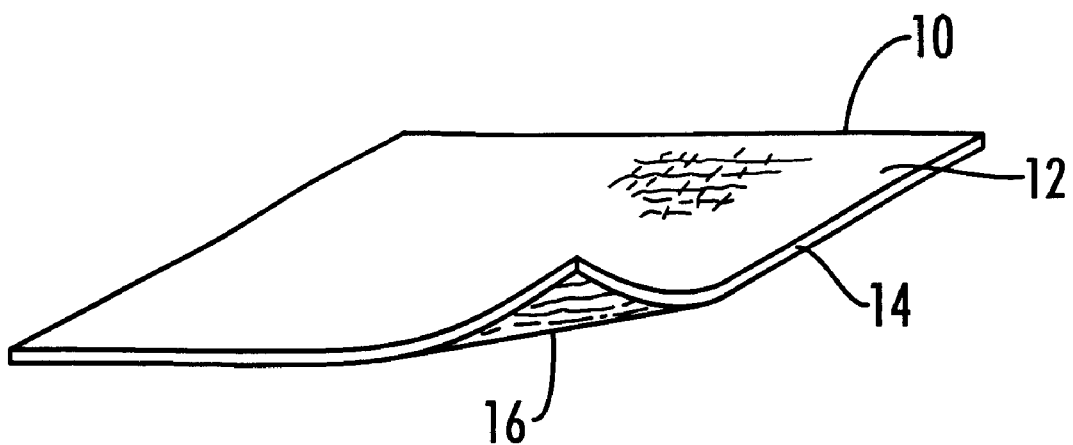
FIG. 1 is a schematic representation of a laminate material embodying various of the features of the present invention.
Figure 2:
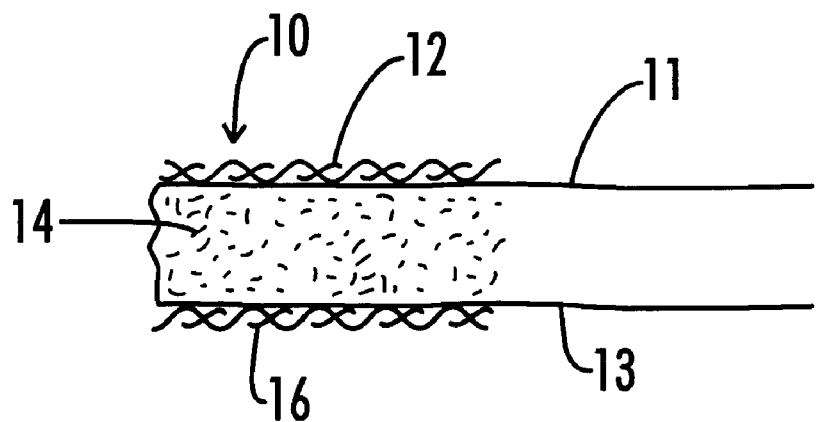
FIG. 2 is a schematic representation, in section, of a portion of a laminated material in accordance with the present invention.
Figure 3:
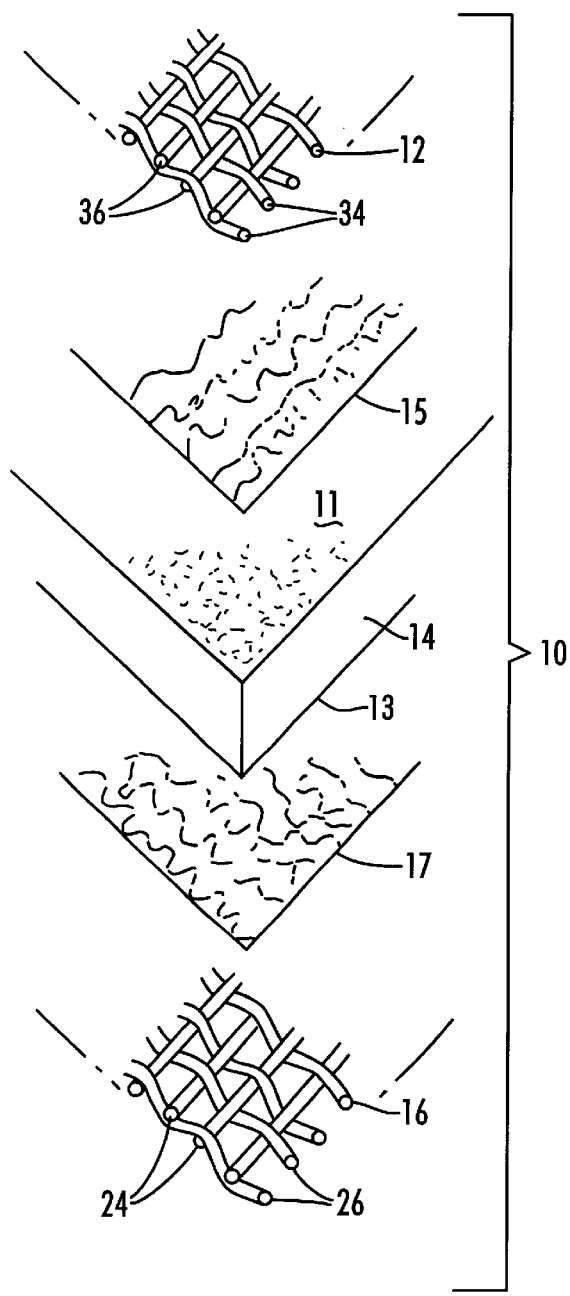
FIG. 3 is an exploded schematic representation of a portion of a laminated web and depicting several layers of the laminated web in accordance with the present invention.

With reference to the several Figures, in FIGS. 1, 2 and 3 there is depicted one embodiment of a laminated material in accordance with the present invention comprising a web 10 having first and second fibrous layers 12 and 16 bonded to the opposite flat surfaces 11 and 13, respectively, of a central layer 14 of reticulated (open-cell) polymer. As seen in FIG. 3, the depicted embodiment of the laminated web includes a central layer 14 of reticulated open cell polymer. This polymer layer preferably is in the form of a flat web having opposite flat surfaces 11 and 13. In the depicted embodiment, a first layer 15 of a gossamer, i.e. light, thin, filmy, adhesive is overlaid on the first flat surface 11 of the polymer web. A second and like gossamer adhesive layer 17 is overlaid on the second flat surface 13 of the polymer web.

Thereafter, or substantially simultaneously therewith, there is overlaid on the adhesive layer 14 a first fibrous web 12 which includes weft strands 34 and warp strands 36. In like manner, a second fibrous web 16, having weft strands 26 and warp strands 24 is overlaid on the second layer 17 of adhesive. As desired or required for effectively bonding the several layers to one another in their overlaid condition, the overlaid layers may be passed through the nip is a set of pressure rolls in the conventional manner as practiced and well-known in the laminating art. One or more of these rolls may be heated as in the instance where the adhesive is a hot melt adhesive. In this manner, the fibrous layers 12 and 14 are securely bonded to the opposite surfaces 11 and 13 of the foam layer 14 at spaced apart locations over substantially the entire area of each of the surfaces 11 and 13 of the polymer layer, but without employing an amount of, and distribution of, adhesive which would materially block the pores of the polymer layer, or block the interstices between the weft and warp strands of either of the fibrous layers. This construction of the laminate ensures that there are developed a large number of open passageways 28 through the thickness of the laminated web for the passage of liquid or gases therethrough as will be referred to hereinafter.

One acceptable polymer is nitrogen-blown natural rubber. The blown rubber is of the open cell type, i.e. reticulated, so that liquid (and vapor) will readily pass through the thickness of the polymer layer. Other expandable (stretchable) polymers which exhibit the required porosity may be employed. Whereas thicknesses of the polymer layer of between about ⅛ inch and about ⅜ inch are most commonly desired and preferred, other thickness of the polymer layer may be employed, depending upon the intended end use of the laminated material. One particularly suitable polymer layer comprises a natural rubber available from Griswald Rubber Company, Inc. of Moosup, Conn. as Product #3122LW polymer.

The adhesive includes a stress propagating agent. The stress propagating agent works with uneven surfaces of the reticulated polymer layer so that the adhesive forms a non-contiguous film between the layers. Thus, the adhesive effectively bonds the reticulated polymer layer with a fibrous layer but is porous so that, in accordance with the objects of this invention, water vapor can easily pass through the laminate web.

An example of a stress propagating agent is an ethylene acrylic acid, ammonium hydroxide and water dispersion. Other examples include a high molecular weight acrylic copolymers, vinyl acetate/acrylic copolymers and terpolymers that have very high glass transition temperatures (Tg or T sub g) which when used without coalescing agent and/or plasticizers are not in themselves film formers; a commercially available product called Surlyn II, at one time available from DuPont; and other vinyl dispersions and/or emulsions.

While an acid resin and wax modified high molecular weight ethylene vinyl acetate water based dispersion can be formulated with various resins, thickeners and processing aids to formulate a variety of low temperature heat seals, such as for paper, rubber to fabric, film to foil, etc., to yield destructive or peelable bonds, it must be enhanced with the above mentioned stress propagating agents and fibers in order to remain porous when heat sealed. Otherwise, the ethylene vinyl acetate will fuse, negating the porosity of the adhesive.

Preferably, the stress propagating agent is a combination of ethylene vinyl acetate emulsion and ethylene acrylic acid emulsions. While stress propagating agents such as ethylene vinyl acetate provide adequate adhesive effects, they are expensive. Thus, to improve the economic viability of the adhesive, the adhesive also includes less expensive adhesion providing components, such a styrene butadiene rubber. Finally, the adhesive can include fillers such as calcium carbonate, clay, mica, talc or the like.

Thus, the preferred formula for the adhesive is as follows:

| Component | % (by weight) | | Commercial Source |
|---|---|---|---|
| | Ideal | Acceptable Range | |
| EVA (Ethylene Vinyl Acetate) water based dispersion | 50% | 50–75% | DuPont |
| Ethylene Acrylic Acid water based dispersion | 25% | 10–25% | Dow Chemical |
| SBR Styrene Butadiene | 15% | 15–30% | Many |
| Filler (Large Particle Size) | 10% | 10–20% | Many |

The adhesive is prepared using EVA combined with SBR for effective adhesion and the Ethylene Acrylic Acid Dispersion (High Tg), Acrylic Copolymers or vinyl (Acrylic Copolymers—High Tg) is added to enhance the stress or craze propagation manifestations. This is also called chicken tracking or mud cracking. Finally, the adhesive can include fillers such as calcium carbonate, clay, mica, talc, filmed silica or the like, preferably in the range of 20–50 micron range, to add surface area for better contact between the substrates.

The adhesive of this type which may be applied directly to the layers which are to be laminated as a powder, or the adhesive may be meltblown onto one of the layers and thereafter the layers are pressed together as by passing them through the nip of a set of pressure rolls. In general, the less adhesive applied, the better, so long a there is generally uniform distribution of the adhesive over the surfaces of the polymer layer and the fibrous layers are securely bonded to the polymer layer.

Woven or knitted webs of either natural or synthetic fibers may be employed as the outer layers 12 and 16 of the present laminated material. One suitable such web is a circle knit polyester web, such as that found in tee shirts, and like garments. These outer layers must be stretchable, preferably to at least the same extent as the polymer layer, so that the fibrous and polymer layers stretch together when the laminated material is formed into a garment and stretched to permit the application of the garment to a body or body part. Resiliency of the fibrous and polymer layers is also required in this type of application in that once the garment is in place on the body or body part, it is desired that the garment tend to return to its unstretched state so that it conforms to the shape of the body or body part and remain in intimate contact with the body or body part. By this means there can be good transfer of liquid or liquid-carrying gases, e.g. perspiration, from the underlying body or body part to that fibrous layer which is next to the body or body part as will appear more fully hereinafter. Improved liquid transfer also destroys the environment for bacterial growth that is produced by the trapping of perspiration. Thus, garments made of the laminate of this invention provide anti-microbial characteristics.

In one method of manufacture of the present laminated material, the polymer layer is blown onto a forwardly moving conveyor and carried on the conveyor for a distance sufficient for the polymer to "blow" and then cool. Thereafter, the adhesive layers are overlaid on the opposite surfaces of the polymer layer, followed by overlayment of the outer fibrous layers onto the adhesive-covered polymer layer. This method of manufacture of laminated webs is well known in the art and the details of the same will be apparent to one skilled in the art.

Figure 4:
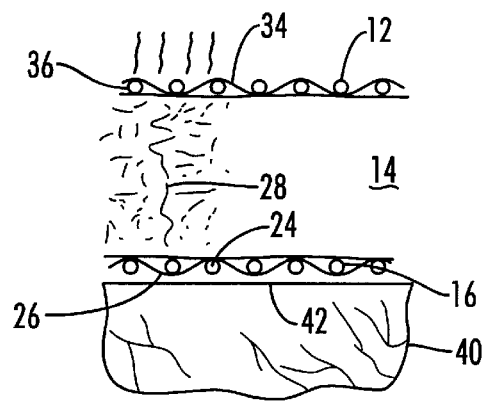
FIG. 4 is an enlarged schematic representation, in section, of a laminated material in accordance with the present invention and depicting the transport of liquid from a covered body part, through the laminate material and eventual evaporation to the ambient atmosphere.

With reference to FIG. 4, when a laminated material embodying the features of the present invention is overlaid on a body part 40, the weft and warp strands 24 and 26, respectively of the outer fibrous layer 16 are in direct contact with the skin 42 of the body part. In this manner, any liquid forming on the skin, such as liquid formed due to perspiration, is immediately taken up by the strands 24 and 26 and caused to flow therealong by the action of the chemical treatment which has been applied to the strands. In turn, this liquid is conveyed to the polymer layer where the liquid is caused to move, via capillarity, through the thickness of the polymer layer. This movement of the liquid through the thickness of the polymer layer is enhanced by pumping movements of the polymer layer as the body part is moved, such as during exercising. After the liquid has passed through the thickness of the polymer layer, the liquid is immediately taken up by the weft and warp strands 34 and 36 of the outer fibrous layer 12, and caused to be distributed along each of these strands by reason of the chemical treatment given the strands. This rapid distribution of the liquid makes it quickly available for evaporation to the ambient atmosphere. By reason of the chemical treatment of the fibrous layers, the above described transfer of the liquid from the body part to the ambient atmosphere is carried out very quickly and efficiently, thereby resulting in quick and efficient cooling of the body part. The efficiency of this liquid transfer is evidenced by the fact that test subjects wearing a garment of the type described and claimed herein over a period of several minutes of vigorous exercise reported no accumulation of moisture between the garment and the covered body part. Like results have been noted where the test subject wore the garment for up to 8 hours while engaging only in normal day-to-day movements. This latter feature of the present invention permits the laminated material to be used successfully and comfortably in knee, ankle and elbow supports, for example.

Chemical treatment of the fibrous layers of the present laminate preferably is accomplished prior to the lamination of the layers to the polymer substrate layer. One suitable chemical treatment is that described in one or more of the following U.S. patents, each of which is incorporated herein by reference:

U.S. Pat. No. 4,563,507 Jan. 7, 1986
U.S. Pat. No. 4,672,005 Jun. 9, 1987
U.S. Pat. No. 4,705,831 Nov. 10, 1987
U.S. Pat. No. 4,726,968 Feb. 23, 1988
U.S. Pat. No. 4,743,267 May 10, 1988
U.S. Pat. No. 4,790,907 Dec. 13, 1988
U.S. Pat. No. 4,806,125 Feb. 21, 1989
U.S. Pat. No. 4,921,890 May 1, 1990
U.S. Pat. No. 5,154,727 Oct. 13, 1992

Darlington Fabrics Corporation of New York, N.Y. offers a knitted fabric identified at No. 2208, comprising 80% 40 denier nylon and 20% 140 denier Spandex which is particularly suitable for use as the outer fibrous layers of the present laminate. This fabric is advertised as being treated by the Intera process under license from Intera Corporation, of Cleveland, Tenn. Fabrics particularly knitted fabrics, of rayon, nylon, acrylic, polypropylene, polyester or combinations of these materials may be employed as the outer fibrous layers of the present laminate. These materials are treatable by the Intera process and when formed into a knitted fabric possess the required expansion and resiliency.

Thus, although there have been described particular embodiments of the present invention of a new and useful Expandable Breathable Laminate, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What is claimed is:

1. A laminate comprising a reticulated polymer layer and a fibrous layer, the layers bonded together with an adhesive that does not impair breathability and expandability of the laminate, the adhesive comprising a water based adhesive;
    wherein the adhesive further comprises a stress propagating agent.

2. The laminate according to claim 1 wherein the fibrous layer further comprises a chemical treatment of fibers in the fibrous layer, the chemical treatment facilitating the flow of a liquid through fibers in the fibrous layer.

3. The laminate according to claim 1 further comprising a second fibrous layer bonded onto a surface of the reticulated polymer layer opposite the first fibrous layer, the second fibrous layer bonded to the reticulated polymer layer with the adhesive.

4. The laminate according to claim 3 wherein both fibrous layers further comprise a chemical treatment of fibers in the fibrous layers, the chemical treatment facilitating the flow of a liquid through fibers in the fibrous layer.

5. A garment made from the laminate described in claim 1.

6. A garment made from the laminate described in claim 2.

7. A garment made from the laminate described in claim 3.

8. A garment made from the laminate described in claim 4.

9. The laminate according to claim 1 wherein the fibrous layer further comprises weft and warp strands, the weft and warp strands woven so as to have interstices between the weft and warp strands that facilitate breathability and expandability of the laminate.

10. The laminate according to claim 1, wherein the stress propagating agent has a high glass transition temperature.

11. The laminate according to claim 1, wherein the stress propagating agent is selected from the group consisting of ethylene acrylic acid; ethylene vinyl acetate; and a combination of ethylene acrylic acid and ethylene vinyl acetate.

12. The laminate according to claim 3 wherein the fibrous layers further comprise weft and warp strands, the weft and warp strands woven so as to have interstices between the weft and warp strands that facilitate breathability and expandability of the laminate.

13. A garment comprising a laminate, said laminate comprising a reticulated polymer layer and a fibrous layer, the layers bonded together with an adhesive that does not impair breathability and expandability of the laminate, the adhesive comprising a water based adhesive, wherein the fibrous layer further comprises weft and warp strands, the weft and warp strands woven so as to have interstices between the weft and warp strands that facilitate breathability and expandability of the laminate; and wherein the adhesive further comprises a stress propagating agent.

14. The garment of claim 13, wherein said garment is a wet suit.

15. The garment of claim 13, wherein said garment is a pair of shorts.

16. The garment of claim 13, wherein the garment is a glove.

17. The garment of claim 13, where said garment is a limb or joint support.

18. A garment comprising a laminate, said laminate comprising a reticulated polymer layer and a fibrous layer, the layers being bonded together with an adhesive that does not impair breathability and expandability of the laminate, the adhesive comprising a stress propagating agent;

wherein the fibrous layer further comprises a chemical treatment of fibers in the fibrous layer; and wherein the fibrous layer further comprises weft and warp strands woven so as to have interstices between the weft and warp strands that facilitate breathability and expandability of the laminate.

19. A laminate comprising a reticulated polymer layer and a fibrous layer, the layers bonded together with an adhesive that does not impair breathability and expandability of the laminate, the adhesive comprising a stress propagating agent.

20. A laminate comprising a reticulated polymer layer and a fibrous layer, the layers bonded together with an adhesive that does not impair breathability and expandability of the laminate, the adhesive comprising a stress propagating agent selected from a group consisting of ethylene acrylic acid, ethylene vinyl acetate, and combination of ethylene acrylic acid and ethylene vinyl acetate.

21. The garment of claim 13, the adhesive further comprising a stress propagating agent selected from the group consisting of ethylene acrylic acid, ethylene vinyl acetate, and combination of ethylene acrylic acid and ethylene vinyl acetate.

22. The laminate of claim 19, the stress propagating agent being selected from the group consisting of ethylene acrylic acid, ethylene vinyl acetate, and combination of ethylene acrylic acid and ethylene vinyl acetate.

23. The garment of claim 18, the adhesive further comprising a stress propagating agent selected from the group consisting of ethylene acrylic acid, ethylene vinyl acetate, and combination of ethylene acrylic acid and ethylene vinyl acetate.

* * * * *